Patented Mar. 29, 1932

1,851,253

UNITED STATES PATENT OFFICE

MAURICE KAHN, OF PARIS, FRANCE, ASSIGNOR TO SOCIÉTÉ FRANCAISE DES PRODUITS ALIMENTAIRES AZOTÉS, OF PARIS, FRANCE

TREATING ALBUMINOID SUBSTANCES

No Drawing.      Application filed May 9, 1925. Serial No. 29,238.

In the previous applications for patents of Maurice Kahn, Éliane Le Breton and Georges Schaeffer, first in United States bearing Serial No. 750,951, filed Nov. 19, 1924, (which has matured to Patent No. 1,724,027, issued August 13, 1929, and second in France Serial No. 189,360 of June 17th, 1924, for improved process for the autolysis of animal and vegetable substances, for which the said Maurice Kahn, Eliane Le Breton and Georges Schaeffer are about to make application in U. S. A.; and in the application in France Serial No. 189,690 of June 25th, 1924, of Maurice Kahn for improved process for the manufacture of certain albumins and fatty matters, for which the said Maurice Kahn is about to make application in U. S. A. various processes are described for obtaining nitrogenous pastes from fish formed of mixtures of aminated acids and polypeptides. Important quantities of oils as well as mixtures of nitrogenous residues and fats useful in the tanning industry can also be obtained by these processes.

In these methods digestion of the albuminoid matters is ensured either by the digestive ferments and endo-cellulars of the fish treated (it may be with a final direct addition of a complement of entrails of the fish), or by the proteolytic enzymes of brewers or distillery yeast.

In these various processes the separation and extraction of the fatty matters takes place after digestion from whence there results that: (1) the fats undergo alteration owing to autoheterolysis, (2) the nitrogenous juices take a fishy taste when fish is used and this is sometimes so pronounced as to necessitate a final deodorization for rendering the pastes edible.

Finally when treating fish, autolysis should be more often carried out on the spot and with the least possible delay.

A process carried out in accordance with this invention on the contrary allows the easy and immediate preparation of clean and unchanged oils; it moreover produces an edible product rich in proteins or in a fit condition to undergo immediate or deferred heterolysis; it comprises finally the preparation of proteolytic extracts especially suitable for effecting the digestion of products rich in proteins produced by the application of this process.

According to this invention the albuminous animal or vegetable substance is first cooked preferably rapidly, the fatty matters (which have been detached from the albuminous substances or which have been liberated during cooking) separated, the remaining mass which has become practically sterilized then either dried with a view to its subsequent use and it may be reduced to meal, or immediately heterolyzed, for example in situ, by means of proteolytic ferments, obtained preferably by a partially antiseptic autolysis of the entrails of fish or brewers' or distillers' yeasts.

The process when fish is to be treated may for example be carried out in the following manner:—

The fish used may be fresh, salted or smoked. Preferably when they are salted the salt is first extracted. The fish is mechanically broken up and the pulp obtained introduced into hermetic cookers of known type which are steam heated by means of a double casing provided with agitating means which pass through the hermetically closed cover; the cookers function as autoclaves. A certain number of cocks are also provided for the introduction of water, solutions of ferments and the extraction of the liquids and solids.

The mass broken up having been introduced with about its own volume of water is heated progressively to from 100 to 120° C. with constant agitation. During this operation (1) the melted fats and oils emulsify, (2) the flesh of the fish is cooked and freed from oil.

Agitation is stopped. The melted fats and oils rise slowly to the surface.

Water and oil are withdrawn and the fats are collected by drying or centrifuging or any other suitable process, refined and utilized in the usual manner.

There is thus obtained: (a) an oil of superior quality, (b) fish water containing nitrogenous matters which may be extracted and put to various uses, (c) the whole of the flesh of the fish and the bony portions free from oil in a practically sterilized condition and no longer having any appreciable fishy odor. The latter is ready to be subjected to the action of ferments.

If heterolysis is not carried out on the spot these residues may be compressed into blocks and slightly salted on the surface to ensure preservation, or dried or transformed into undecomposable fish meal. The flesh of the fish thus treated is easily transported without risk of going bad.

On the other hand according to the present invention proteolytic extracts may be prepared by partially autolyzing either the remains or entrails of fish or brewers' or distillery yeasts.

When treating remains or entrails of fish, residues of the fish industry, which comprise the digestive organs (livers, hepatopancreas, kidneys and genital organs) these are collected and iced or salted and are treated in as fresh a condition as possible. They are broken up into a fine condition and treated for 24 to 48 hours in a cooker at an autolyzing temperature, for example about 40° C., with water mixed with from 5 to 10% of chloroform and 5 to 10% toluene, with frequent agitation. The mixture is then dried, filtered and a clear solution of ferments sterilized by the mixture of chloroform and toluene obtained; fats and nitrogenous residues suitable for use as manure are also obtained during this operation.

When using brewers' or distillery yeasts, the yeasts preferably cleaned are agitated with about one third their volume of water mixed with chloroform and toluene and kept at an autolyzing temperature, for example about 40° C., for 24 to 48 hours. The liquid portion is then separated from the cellulosic residues of the yeast. These residues which still contain nitrogen can either be used directly for the manufacture of degras or may have added thereto an equal volume of fresh yeast and then autolyzed to ensure the complete recovery of the nitrogen they contain.

The extracts formed from solutions thus obtained either from the remains of fish or from yeast possess great proteolytic activity with respect to the flesh of the cooked fish and the yields obtained are also as satisfactory both when using the ferments from the yeasts as those from fish remains.

Treatment of the matter by means of these proteolytic extracts as has been explained above beginning with the cooking of the fish and the extraction of its oil takes place as follows:

If cooked fish (to which is added a certain quantity of water, for example about 20%) is to be digested in situ, it is brought to a temperature of 45° C., a suitable quantity of a solution of the ferments is then introduced into the cooker, care being taken to avoid contamination. The proportion of ferment to be added varies considerably depending on the nature of the ferment. For example, good results have been obtained using 15% of autolyzed fish residue, and with 25% to 35% of autolyzed yeasts. The apparatus is by thermostatic means maintained at a temperature of 40 to 45° C. for from two to five days with continuous agitation.

When digestion is ended the apparatus is evacuated and the nitrogenous juices containing aminated acids and polypeptides filtered, to separate them from the bony débris and undigestable portions. The juices are evaporated in vacuo to a pasty consistency with 30% of water.

If the fish is to be stored before digestion, the flesh, after boiling and extracting the oil, is compressed into blocks which are slightly salted on the surface and transported either in sterilized containers or refrigerators.

To carry out digestion the material is brought into contact with a suitable quantity of water, then subjected to the action of ferments such for example as those prepared as described above.

This process has the following advantages:—

1. It can be applied to entire fish or to the residue of the fish industry and whether fresh, salted or smoked.

2. It furnishes straight away an unchanged clean oil for the reason that the heating is of short duration out of contact with air. The oil can be separated in a much more simple manner than where fish has been allowed to become putrefied or when direct autolysis is prolonged.

3. The process yields fish flesh in a form by which it can either be preserved for a considerable time, or easily transported or can be immediately digested or again transformed into meal.

4. The nitrogenous pastes obtained contain no or little salt and are of greater general utility than nuocmam manufactured by the Indo-Chinese which is highly salted. Those pastes obtained from the mixture with the juices of partially autolyzed yeasts have a high nutrient value and contain large proportions of vitamines B. The separation of the fats before autolysis prevent these pastes having any fish taste and renders them particularly suitable for mixing with similar products of different flavours.

What I claim is:—

1. A process for obtaining nitrogenous extracts which consists in cooking an albuminoid substance with substantially all its albuminous matter and without heterolyzing, to separate the fattey matter, removing the fatty matter from the mass, and subjecting the mass after removal of the fatty matter to heterolysis.

2. A process for obtaining nitrogenous extracts which consists in cooking an albuminoid substance with substantially all its albuminous matter in water at a temperature of 100° to 120° C. with agitation and without heterolyzing to separate the fatty matter, removing the fatty matter from the mass, drawing off the liquid and subjecting the mass to heterolysis.

3. A process for obtaining nitrogenous extracts and oils which consists in cooking a solid albuminous substance, separating fatty matters from the mass, then subjecting the mass to heterolysis in the presence of water and a proteolytic ferment which has been produced by subjecting a solid albuminoid substance to autolysis with water in the presence of the antiseptic and separating the liquid from the solids.

4. A process for obtaining nitrogenous extracts and oils which consists in first cooking a solid albuminoid substance, then separating fatty matters from the mass, treating the mass to prevent decomposition and subsequently subjecting the mass to heterolysis in the presence of a ferment.

5. A process for obtaining nitrogenous extracts and oils which consists in first cooking a solid albuminoid substance, then separating fatty matters from the mass, treating the mass to prevent decomposition and subsequently subjecting the mass to heterolysis in the presence of a ferment produced by the autolysis of an albuminoid substance.

6. A process for obtaining nitrogenous extracts and oils which consists in cooking fish, separating fatty matters from the mass, then subjecting the mass to heterolysis in the presence of water and a proteolytic ferment which has been produced by cooking fish, then subjecting it to autolysis with water in the presence of an antiseptic and separating the liquid from the solids.

7. The process of obtaining nitrogenous extracts from albuminous substances which comprises, first subjecting the raw material to a rapid cooking in water to separate the fatty matters, removing the fatty matters, drawing off the liquid, and then subjecting the remaining solid mass free from fatty matters to heating in the presence of ferments.

In testimony that I claim the foregoing as my invention I have signed my name.

MAURICE KAHN.